US012457295B2

(12) United States Patent
Mahajan et al.

(10) Patent No.: US 12,457,295 B2
(45) Date of Patent: Oct. 28, 2025

(54) REAL TIME AI/ML BASED MONITORING AND TRIGGERING APP TO DESTRESS CONTACT CENTER ASSOCIATES

(71) Applicant: Bank of America Corporation, Charlotte, NC (US)

(72) Inventors: Nipun Mahajan, Lawrenceville, NJ (US); Ayela Chughtai, New York, NY (US); Sushama Shelke, Mumbai (IN); John T. Blackmon, Jacksonville, FL (US); Yogesh Raghuvanshi, Pennington, NJ (US); Amit Mishra, Chennai (IN); Saravana Prakash Kumaresan, Plainsboro, NJ (US)

(73) Assignee: Bank of America Corporation, Charlotte, NC (US)

( * ) Notice: Subject to any disclaimer, the term of this patent is extended or adjusted under 35 U.S.C. 154(b) by 168 days.

(21) Appl. No.: 18/428,123

(22) Filed: Jan. 31, 2024

(65) Prior Publication Data
US 2025/0247471 A1 Jul. 31, 2025

(51) Int. Cl.
*H04M 3/00* (2024.01)
*G06V 40/16* (2022.01)
*G06V 40/20* (2022.01)
*H04M 3/51* (2006.01)

(52) U.S. Cl.
CPC ........ *H04M 3/5175* (2013.01); *G06V 40/176* (2022.01); *G06V 40/20* (2022.01); *H04M 2201/40* (2013.01)

(58) Field of Classification Search
CPC ............ H04M 3/5175; H04M 2201/40; G06V 40/176; G06V 40/20
USPC ....... 379/265.01–265.14, 266.01–266.1, 309
See application file for complete search history.

(56) References Cited

U.S. PATENT DOCUMENTS

| 8,715,179 B2 | 5/2014 | Price et al. |
| 11,455,475 B2 | 9/2022 | Wooters |
| 11,870,936 B1* | 1/2024 | Schwarz, Jr. ....... H04M 3/5233 |
| 2003/0139654 A1 | 7/2003 | Kim et al. |
| 2005/0154264 A1 | 7/2005 | Lecompte et al. |
| 2015/0271329 A1* | 9/2015 | Deshmukh ........... A61B 5/0022 |
| | | 379/265.06 |
| 2019/0158671 A1* | 5/2019 | Feast ...................... G06Q 10/10 |

* cited by examiner

Primary Examiner — William J Deane, Jr.
(74) Attorney, Agent, or Firm — Weiss & Arons LLP

(57) ABSTRACT

A method for destressing an agent in a contact center in real-time may include receiving an agent's login and routing incoming voice calls to the agent. A monitoring and triggering application ("MTA") may receive data about the agent's performance during calls from a statistics server. A graphics processing unit may run an MTA artificial intelligence machine learning ("MTA AI/ML") algorithm to determine a stress level of the agent by analyzing video, audio, and other metrics during calls. The MTA AI/ML algorithm may recommend to the agent's manager that the agent be given a destress break. When approved, calls may be routed to other agents while the agent receives a video, audio, or game to destress. The agent may receive the break without any negative impact on metrics relating to the agent's performance. The agent may re-enter the call routing server to receive incoming calls upon completion of the break.

20 Claims, 11 Drawing Sheets

REAL TIME AI/ML BASED MONITORING AND TRIGGERING APP TO DESTRESS CONTACT CENTER ASSOCIATES

FIELD OF TECHNOLOGY

Aspects of the disclosure relate to artificial intelligence machine learning monitoring and triggering application for destressing a contact center agent.

BACKGROUND OF THE DISCLOSURE

Contact center associates, including contact center agents, may have to attend to the customer calls one after the other and resolve customer queries. There may be limited options available for tracking the agent to see if they need a break beyond the number of breaks allotted to them in a typical work schedule.

Agent exhaustion may be an example of a justified cause for providing a break to the agent. There may be several reasons which can lead to agent exhaustion, such as long hours of working or stress caused by specific calls. These reasons and others may cause the agent fatigue and irritation, which may affect the agent's attention, mood, and eventually, the quality of conversation with the customer.

SUMMARY OF THE DISCLOSURE

Agent exhaustion may be addressed by providing the agent with a break to destress.

The method may include a method for destressing an agent in a contact center of an enterprise.

The method may include, at a first enterprise server in electronic communication with a computer processer associated with the enterprise, receiving a login event from a device of a contact center agent. The contact center agent may herein be called an agent. The first enterprise server may include managing a flow of incoming voice calls to the contact center.

The method may include using the central processing unit ("CPU") in electronic communication with the first enterprise server to route one or more incoming voice calls to the agent.

The method may include using the CPU to notify a monitoring and triggering application ("MTA") of the login event.

The method may include using the CPU to subscribe to a second enterprise server. The second enterprise server may provide call statistics about the agent to the MTA.

The method may include using a graphics processing unit ("GPU") to run an MTA artificial intelligence machine learning ("MTA AI/ML") algorithm. The MTA AI/ML algorithm may determine the stress level of the agent. The GPU may be in electronic communication with the CPU.

The method may include the MTA AI/ML algorithm receiving, at the GPU, one or more video clip samples of the agent. The video clip samples may be taken during a voice call between the agent and a customer. The method may include the GPU to run the MTA AI/ML to timestamp the video clip samples. The method may include using the GPU to run the MTA AI/ML algorithm to run a vision transformer to transform a video clip sample. The method may use the vision transformer to perform facial expression analysis and/or gesture analysis to obtain one or more video features. The video features may include a facial expression emotion value feature and/or a gesture recognition value feature.

The method may include using the GPU to run the MTA AI/ML algorithm to determine when a video feature falls below a predetermined threshold. Each of the one or more video features may have its own predetermined threshold. Falling below a predetermined threshold may indicate the agent is experiencing stress and may benefit from receiving a destress break. The destress break may reduce the stress level of the agent.

The method may include, when a video feature falls below a predetermined video threshold, using the GPU to run the MTA AI/ML algorithm determine and/or analyze an audio feature available with an overlapping timestamp to confirm that the agent is experiencing stress. The method may include determining when there is synchronization in a detection of stress in the agent between the video features and the audio features.

The method may include the MTA AI/ML algorithm receiving, at the GPU, one or more speech samples of the agent. The speech samples may be taken during a voice call between the agent and a customer. The method may include the GPU to run the MTA AI/ML to timestamp the speech samples. The method may include using the GPU to run the MTA AI/ML algorithm to run a speech transformer to transform a speech sample. The method may use the speech transformer to perform voice analysis and/or sentiment analysis to obtain one or more audio features. The audio features may include a sentiment score of a call feature, a tone score from a call transcript feature, and/or a tone score from a voice analysis feature The method may include using the GPU to run the MTA AI/ML algorithm to determine when an audio feature falls below a predetermined threshold. Each of the one or more audio features may have its own predetermined threshold. Falling below a predetermined threshold may indicate the agent is experiencing stress and may benefit from receiving a destress break.

The method may include, when an audio feature falls below a predetermined audio threshold, using the GPU to run the MTA AI/ML algorithm determine and/or analyze a video feature available with an overlapping timestamp to confirm that the agent is experiencing stress. The method may include determining when there is synchronization in a detection of stress in the agent between the video features and the audio features.

The method may include, when a video feature, an audio feature, or both a video feature and an audio feature falls below a predetermined threshold, and the video features and the audio features are synchronized, providing, using the CPU in electronic communication with the GPU, notification to a supervisor of the agent that the agent is eligible for a destress break.

The method may include receiving, at the CPU, an approval from the supervisor for the agent to receive the destress break.

The method may include, when the agent completes a most recent incoming voice call, routing, using the CPU in electronic communication with the first enterprise server, incoming voice calls away from the agent.

The method may include, providing, using the CPU in electronic communication with the first enterprise server, on the device of the agent, the destress break.

The method may include, when completing the destress break, routing, using the CPU in electronic communication with the first enterprise server, incoming voice calls to the agent.

The destress break may be provided to the agent without affecting metrics relating to the agent's efficiency from a reporting perspective.

The destress break may have a duration that is between one minute and five minutes.

The method may include, when a video feature falls below a predetermined video threshold leading to the destress break, analyzing the agent, during the destress break, using the GPU to run the MTA AI/ML algorithm, to determine when the video feature no longer falls below its predetermined video threshold. When the video feature no longer falls below its predetermined video threshold, and a predetermined threshold of time has elapsed, completing the destress break.

A determination of the stress level of the agent may be performed in real-time. The device of the agent may include a desktop computer station. The device of the agent may include a desktop computer station.

The agent may be kept logged on to the first enterprise server while the contact center agent receives the destress break. The agent may be logged off of the first enterprise server while the contact center agent receives the destress break.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
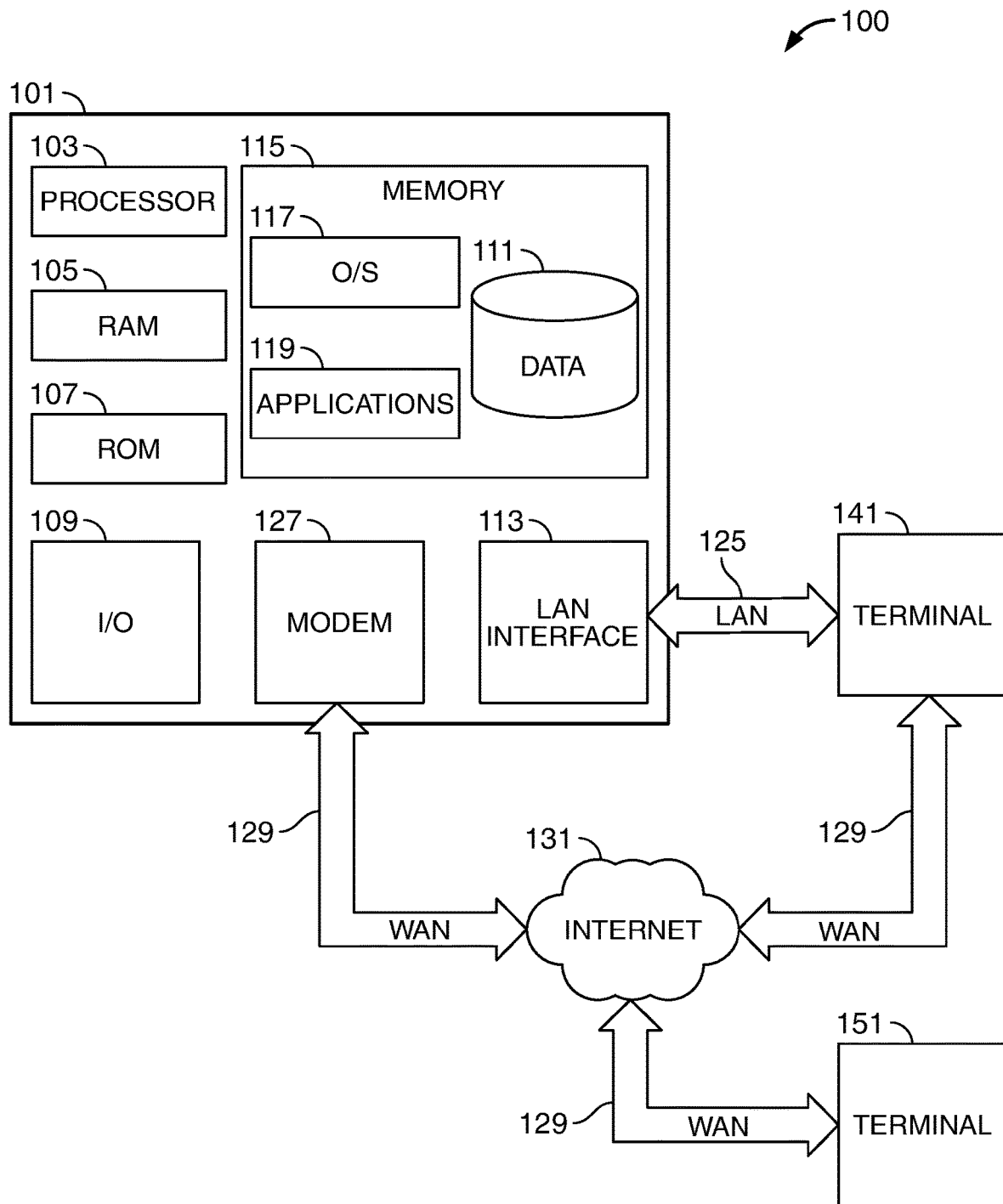
FIG. 1 shows an illustrative block diagram in accordance with principles of the disclosure.

Provided are apparatus and methods for destressing an agent in a contact center of an enterprise. The apparatus may implement the methods.

The apparatus and methods may include building an MTA which may determine a contact center agent's needs based on an MTA AI/ML algorithm. The MTA AI/ML algorithm may propose a destress opportunity to the contact center agent, herein called agent, after considering several factors.

The apparatus and methods may include building the MTA which may determine a call center agent's needs based on the MTA AI/ML algorithm. The MTA AI/ML algorithm may propose a destress opportunity to the call center agent, after considering several factors.

The apparatus and methods may include a call center with a team of agents who answer a large volume of calls coming into an organization and/or going out from the organization. The party outside the organization may include existing customers or potential customers.

The apparatus and methods may include a contact center with a team of agents who answer a large volume of communications coming into an organization and/or going out from the organization. The party outside the organization may include existing customers or potential customers. The communications may include phone calls, emails, live chats, social media interactions, and other communication channels.

The apparatus and methods may include inputs into the MTA AI/ML algorithm may include capturing audio and video of the agent, along with other metrices from the server. There are multi-dimensional transformers that may extract various numerical and categorical features, like the tone, sentiment, facial expressions, and number of calls answered, from the input signal applied.

The apparatus and methods may include numerical features and categorical features. Examples of numerical features include sentiment score of calls, tone score from transcript for each emotion selected, tone score from voice analysis, number of calls answered, time since last break, and duration of calls.

Sentiment score of calls may include a result of a sentiment analysis of the transcript of the call. This may tell if a general sentiment of the user is positive, negative, or neutral, and the magnitude to which it is inclined in either direction. This score may be between $-1$ and 1, with $-1$ being the most negative sentiment, 1 being the most positive sentiment, and 0 being neutral. A threshold may be employed, for example, an agent sentiment score cannot drop below $-0.5$.

Tone score from transcripts for each emotion selected may include a result of a tone analysis performed on the transcript of the call. This will tell a score for the agent in the following categories: excited, frustrated, impolite, polite, sympathetic, satisfied, and sad. This score may be between 0 and 1, with 0 meaning that the tone was not expressed and 1 being the maximum expression of the tone. A threshold can be employed, for example, agent politeness score cannot drop below 0.5.

Tone score from voice analysis may include a result of a sentiment analysis performed on the audio of the call. This may tell if the general sentiment of the user is positive, negative, or neutral, and the magnitude to which it is inclined in either direction. This score may be between $-1$ and 1, with $-1$ being the most negative sentiment, 1 being the most positive sentiment, and 0 being neutral.

The number of calls answered may include the number of calls the agent answered since the agent's last break.

Time since last break may include the time since the agent last took a break or was last given a destress break by the system. A threshold may be employed, for example, an agent must take a short break every 90 minutes, or an agent cannot be given a short break if less than 60 minutes have passed since the agent's last break.

Duration of calls may include the duration of calls the agent answered since the agent's last break.

Examples of categorical features may include call escalation, facial expression detection, and gesture recognition. Categorical features may include binary decisions.

Presence of call escalation may be measured to include a one-hot encode (binary) to reflect if any calls were escalated (encoded to 1) or not escalated (encoded to 0). Escalation of calls may indicate that the agent has been dealing with more complex and stressful calls Facial expression detection may include the agent's emotional expressions, such as smiling, frowning, yawning, blinking. These emotional expressions may be identified and categorized by emotions like happy, sad, tired, etc. Each emotion may be measured and assigned a one-hot encode (binary) to reflect if a certain emotion was detected (encoded to 1) or not detected (encoded to 0).

Gesture recognition may include the agent's hand gestures. The hand gestures may be identified and categorized by emotions such as happy, sad, tired, etc. Each gesture may be measured and assigned a one-hot encode (binary) to reflect if a certain emotion was detected (encoded to 1) or not detected (encoded to 0).

The apparatus and methods may include a processor. The processor may include multiple transformer units for recognition of several features like sentiment score, tone score, emotion, and expression. There may be separate transformer units to recognize the audio, video, and server inputs. The transformer units may be trained separately for each agent.

When the agent logs into a system such as the telephony interaction server, trained transformers specific to the agent may get pulled automatically. The output features from these transformers may be weighted as per the priority assigned to those features. For example, tone may be weighed more than the number of calls answered, or vice versa.

The audio and the video transformers may be synchronized. Synchronization may help by validating the agent status. For example, if the agent is irritated, it may be reflected in the tone as well as facial expression. Over the time of a call and throughout a workday, the features might change for the agent. The timestamp tracker may help keep track of the agent's features throughout the day. If the features go beyond a certain variance, the transformer may be trained for the new and/or updated features. For example, when the agent gains expertise, the average handling time ("AHT") may be less, and the number of calls answered might be more.

Finally, the features may be compared with the preset or real-time set threshold for making a final decision if the agent is eligible for the destress break. The thresholds may be relative for each agent. The thresholds may be equivalent for all agents at a similar experience level. The thresholds may be equivalent for all agents across the enterprise.

The apparatus and methods may include post-processing. There may be several output decisions and corresponding post-processing actions. For example, if the agent is not eligible for destress break, there may be no further action.

If the agent is eligible for a destress break, the agent's supervisor may be notified to accept or decline the issuance of the destress break. If the supervisor declines the notification, no further action may be taken. If the supervisor accepts the notification, the agent may be relieved and gets the destress break. The destress break may be of different durations, such as two-minutes.

If the agent is eligible for the destress break due to exhibiting negative features, then call transfer protocol may be initiated. Exhibiting negative features may include an unpleasant conversation between the caller and the agent, or the agent exhibiting negative, angry, or aggressive dialogue, then the agent may be relieved from the call. The call may be transferred to another agent.

When the call is transferred to another agent, one or more of the following steps may be initiated. The caller context and call updates may be transferred to another agent. The caller, customer, and context data may be saved to avoid similar combination in future. The agent's expertise level may be updated to stop similar expertise calls in future.

The apparatus and methods may include an output synchronization function. The output synchronization function may indicate whether the audio and the video transformers are synchronized. Synchronizing the audio and video transformer may help to validate the agent status. For example, if the agent is irritated, it may be reflected in the tone and facial expression. If the agent is tired, the agent may yawn frequently.

The video of the agent may be applied to the first transformer to recognize the gestures. The voice of the agent may be applied to the second transformer to recognize the emotions and the sentiments from its transcription. The recognized outputs of both the transformers may be applied to the output synchronization function to validate the agent mental status.

The output synchronization function may show a measurement relating to the mapping of gestures, emotions, and sentiments. If the mapping is synchronized, then the output synchronization function may be 1. If the mapping is not synchronized, then the output synchronization function may be 0. The output of the synchronization function may include a synchronization status. The synchronization status may be time stamped and calculated for each call. The synchronization status of 1 may aid in making the decision of destress break for the agent.

The apparatus and methods may compare recognized features with set thresholds for making a final decision. The set thresholds may be predetermined or determined in real-time. The decision may be either that the agent is eligible break or agent is not eligible for break. The MTA AI/ML algorithm may provide the break eligibility status to the supervisor for acceptance or rejection. In some negative situations, like call escalations and negative emotions, the agent may be given a break and relieved from the current call. The call may be transferred to another agent.

The apparatus and methods may include a provision for checking the decisions from the transformers and validating them for facilitating the correct decision. For example, the output from the video and speech samples may be synchronized to determine if a decision from one of the transformers is aligned with the feedback from another transformer. There may also be a provision for training the transformers when the features change beyond a set variance.

The apparatus and methods may address the challenge of deciding if the agent should be given a destress break based upon non-invasive methods. The apparatus and methods may help prevent the agent from reaching a saturation level of stress. The apparatus and methods may keep the agent focused on helping the customers of the organization. The apparatus and methods may take care of the well-being of the agent's mental state and help enhance customer satisfaction.

The apparatus and methods may provide a system that recommends when an agent should receive a destress break. The apparatus and methods may provide a system that recommends content for a destress break such as a video, an audio, or a game. The agent may take the destress break without impacting on the agent's efficiency from a reporting perspective. The MTA AI/ML algorithm in real-time may provide individual transformer results. This MTA AI/ML algorithm may train the transformers again when the parameters fall below the threshold. The MTA AI/ML algorithm may validate the transformer results against other transformer results with a similar timestamp using a synchronizer.

The apparatus may include a system for destressing an agent in a contact center of an enterprise.

The system may include a desktop computer station of an agent;

The system may include a first enterprise server. The first enterprise server may include a telephony interaction server for managing a flow of incoming voice calls to the contact center.

The system may include a second enterprise server. The second enterprise server may include a statistics server for providing call statistics about agents.

The system may include the GPU.

The system may include the CPU. The CPU may be in electronic communication with the desktop computer station of the agent, the first enterprise server, the second enterprise server, and/or the GPU.

The system may include the MTA. The MTA may run on the GPU. The MTA may run on the CPU. The MTA may comprise the MTA AI/ML algorithm.

The system may include the first enterprise server in electronic communication with the CPU. The system may include the first enterprise server configured to receive a login event from the desktop computer station of an agent. The system may include the first enterprise server configured to route one or more incoming voice calls to the agent.

The CPU may be configured to notify the MTA of the login event. The CPU may be configured to subscribe to a second enterprise server. The second enterprise server may provide call statistics about the agent to the MTA.

The system may include the GPU in electronic communication with the CPU. The system may include the GPU configured to run the MTA AI/ML algorithm. The MTA AI/ML algorithm may determine the stress level of the agent.

The GPU may be configured to run the MTA AI/ML algorithm. The algorithm may comprise receiving video clip samples of the agent. The video clip samples may come from videoing an agent during a voice call. The algorithm may include timestamping the video clip samples.

The GPU may run the MTA AI/ML algorithm. The algorithm may transform the video clip samples to perform facial expression analysis and/or gesture analysis. The algorithm may use a vision transformer to transform the video clip samples. Video features may come from facial expression analysis and/or gesture analysis. Video features may include a facial expression emotion value feature and/or a gesture recognition value feature.

The algorithm may determine when video features fall below a predetermined threshold. The MTA AI/ML algorithm may set the predetermined threshold before the audio call begins. The MTA AI/ML algorithm may set the predetermined threshold after the audio call begins. Exceeding the predetermined threshold may indicate that the agent is experiencing stress. Each of the video features may have its own predetermined threshold.

When a video feature falls below a predetermined video threshold, the algorithm may determine audio features available with an overlapping timestamp. The algorithm may analyze the audio features available with an overlapping timestamp to confirm that the agent is experiencing stress.

Synchronization may occur when an audio feature with an overlapping timestamp confirms a video feature that falls below a predetermined video threshold, indicating the agent may feel stressed. Synchronization may not occur when an audio feature with an overlapping timestamp contraindicates a video feature that falls below a predetermined video threshold. In this case, the system may wait for another feature indication before offering a destress break to the agent.

The algorithm may determine when audio features fall below a predetermined threshold. The MTA AI/ML algorithm may set the predetermined threshold before the audio call begins. The MTA AI/ML algorithm may set the predetermined threshold after the audio call begins. Exceeding the predetermined threshold may indicate that the agent is experiencing stress. Each of the audio features may have its own predetermined threshold.

When an audio feature falls below a predetermined audio threshold, the algorithm may determine video features available with an overlapping timestamp. The algorithm may analyze the video features available with an overlapping timestamp to confirm that the agent is experiencing stress.

Synchronization may occur when a video feature with an overlapping timestamp confirms an audio feature that falls below a predetermined audio threshold, indicating the agent may feel stressed. Synchronization may not occur when a video feature with an overlapping timestamp contraindicates an audio feature that falls below a predetermined audio threshold. In this case, the system may wait for another feature indication before offering a destress break to the agent.

For synchronization of a video feature and an audio feature, both the video feature and the audio feature may need to fall below their respective video threshold and audio threshold. For synchronization of the video feature and the audio feature, only the video feature may need to fall below its video threshold while the audio feature may need to be close to its audio threshold even if it does not fall below the audio threshold. For synchronization of the video feature and the audio feature, only the audio feature may need to fall below its audio threshold while the video feature may need to be close to its video threshold even if it does not fall below the audio threshold.

The system may determine when a video feature, an audio feature, or both a video feature and an audio feature fall below their predetermined threshold, indicating the agent may need a destress break to reduce their stress level. The system may then determine if the video feature and the audio feature are synchronized. If they are synchronized, then the agent's supervisor may be given the option of allowing the agent to have a destress break. The CPU may receive an approval from the supervisor for the agent to receive the destress break.

Upon receiving the supervisor's approval, the system may route incoming voice calls away from the agent. The system may provide the agent with the destress break. When the agent completes the destress break, the system may continue routing incoming voice calls to the agent.

The destress break may have a duration. The destress break may have a duration comprising between one minute and five minutes.

When a video feature falls below a predetermined video threshold leading to the destress break, the system may be configured to continue to monitor the video of the agent. When the destress break is completed, if the video feature of the agent still falls below the predetermined video threshold, another destress break may be offered to the agent.

The destress break may be provided to the agent without effecting metrics relating to the agent's efficiency from a reporting perspective. The system may include where the agent is kept logged on to the first enterprise server while the contact center agent receives the destress break. The system may include where the agent is logged off of the first enterprise server while the contact center agent receives the destress break.

Metrics relating to the agent's efficiency may include one or more of the following that are measured throughout, or at varying times during the agent's workday: the number of breaks taken; the duration of each break; the total duration of the breaks; how many calls were answered; the average length of each call; the average of how many words were need to complete the call; how many calls were elevated to the agent's manager or elsewhere in the contact center; the complexity of the matter handled during the call; time between each of the breaks; among other possible metrics.

Numerical features relating to the agent's efficiency may include one or more of the following that are measured throughout the agent's workday: sentiment score of calls; tone score from the transcript for each call, such as emotional sections of the call; tone score from voice analysis; among other numerical features. Numerical features may include value along a spectrum. Numerical features may include binary values.

Categorical features relating to the agent's efficiency may include one or more of the following that are measured throughout the agent's workday: call escalation; facial expression emotion; gesture recognition; among other categorical features. Categorical features may include binary values. Categorical features may include a value along a spectrum.

The destress break may be provided to the agent without effecting the agent's efficiency from a reporting perspective include not effecting metrics, numerical features, and/or categorical features relating to the agent. This may be accomplished by keeping the agent logged on to the first enterprise server while receiving the destress break. This may be accomplished by logging off the agent from the first enterprise server while the receiving the destress break.

A determination of the stress level of the agent may be performed in real-time.

The destress break may include providing the agent with a video recording, an audio recording, or a game.

The system may avoid penalization of the agent during the destress break.

A method may include an agent logging into a telephony interaction server and creating a login event. The server may control telephony interactions via an agent desktop. The server may control the flow of work items to the agent. The telephony interactions may include work items. The MTA may subscribe to a call statistics server for the information about the agent upon the agent's login event.

The method may include executing the MTA AI/ML algorithm to determine the mental and emotional state of an agent. When the MTA AI/ML algorithm determines that the agent may need a destress break, also known as a destress work item, the MTA AI/ML algorithm may submit an agent-specific destress work item to the telephony interaction server. When sending a destress work item, a call router may block the agent from receiving other calls.

The method may include, once the agent completes the current call, the call router routing the agent to the destress work items to the agent. The telephony interaction server may deliver the destress work item to the agent's desktop. A URL may accompany the work item. A user interface on the agent's desktop may play the destress work item, such as video, audio, or game.

The user interface that is playing the destress work item may automatically close the destress work item once finished. Once completing the destress work item, the telephony interaction server may resume directing voice calls to the agent.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all the elements and apparatus of system 100.

Computer 101 may have a processor 103, including a central processing unit ("CPU"), for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components, such as graphics processing unit ("GPU"), EEPROM, Flash memory, neural-network processing elements, or any other suitable components, may also be part of the computer 101.

Memory 115 may be comprised of any suitable permanent storage technology—e.g., a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network interface 113. System 100 may operate in a networked environment supporting connections to one or more remote computers, such as terminals 141 and 151. Terminals 141 and 151 may be personal computers or servers that include many or all the elements described above relative to system 100. The network connections depicted in FIG. 1 include a local area network ("LAN") 125 and a wide area network ("WAN") 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that network connections shown are illustrative and other means of establishing a communications link between computers may be used. The existence of various well-known protocols such as TCP/IP, Ethernet, FTP, HTTP, and the like is presumed, and the system can be operated in a client-server configuration to permit retrieval of data from a web-based server or application programming interface ("API"). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service ("SMS"), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform tasks or implement abstract data types. A computing system may be operational with distributed computing environments. Tasks may be performed by remote processing devices that are linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform tasks or implement data types. The invention may also be practiced in distributed computing environments. Tasks may be performed by remote processing devices that are linked through a communications network. In a distributed computing environment, programs may be in both local and remote computer storage media including memory storage devices. It should be noted that such programs may be considered for the purposes of this application as engines with respect to the performance of the tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. Differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
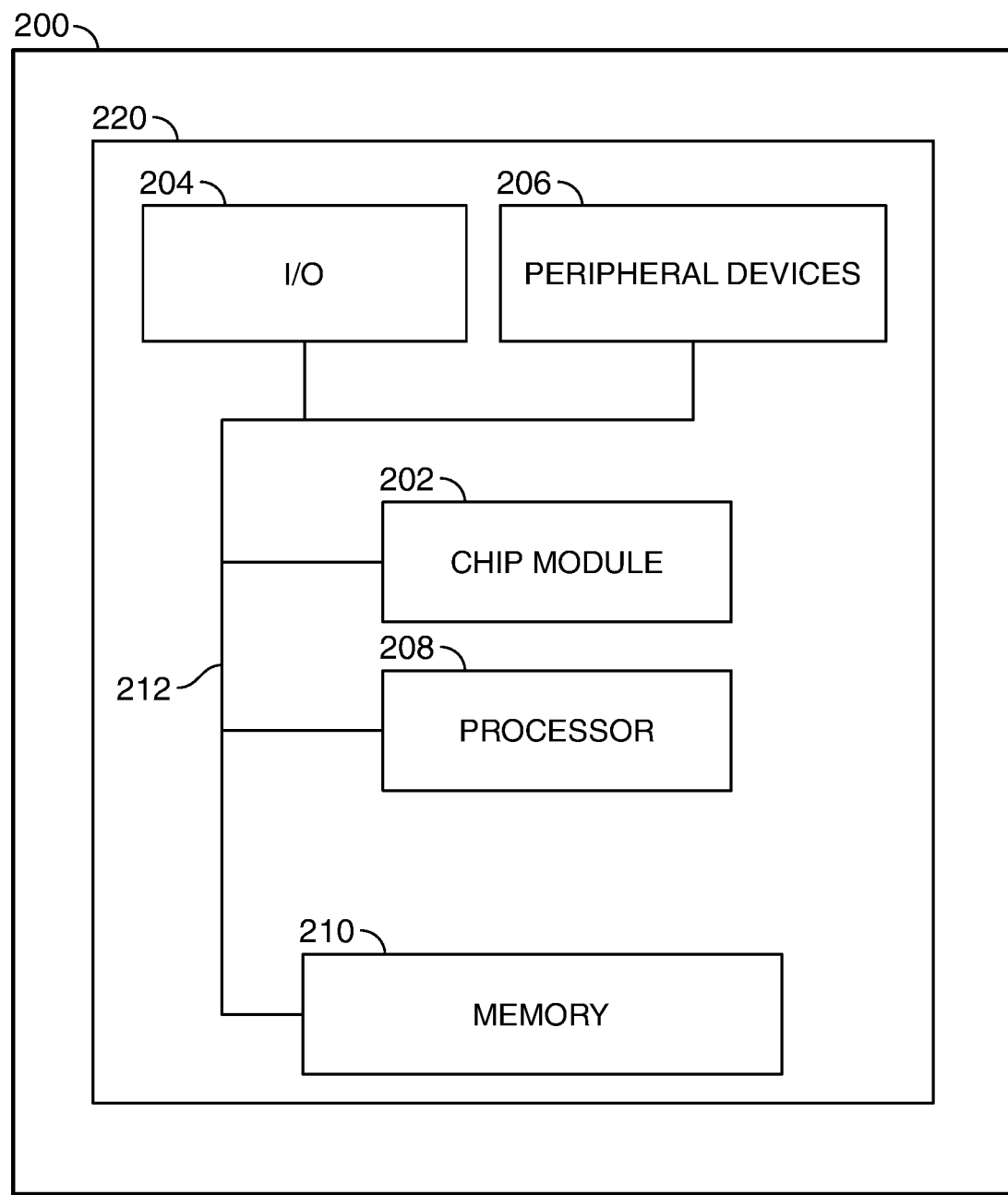
FIG. 2 shows an illustrative block diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, that may include one or more integrated circuits, and that may include logic configured to perform any other suitable logical operations.

Apparatus 200 may include one or more of the following components: I/O circuitry 204, that may include a transmitter device and a receiver device and may interface with fiber optic cable, coaxial cable, telephone lines, wireless devices, PHY layer hardware, a keypad/display control device or any other suitable media or devices; peripheral devices 206, that may include counter timers, real-time timers, power-on reset generators or any other suitable peripheral devices; logical processing device 208, that may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119 (shown in FIG. 1), signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
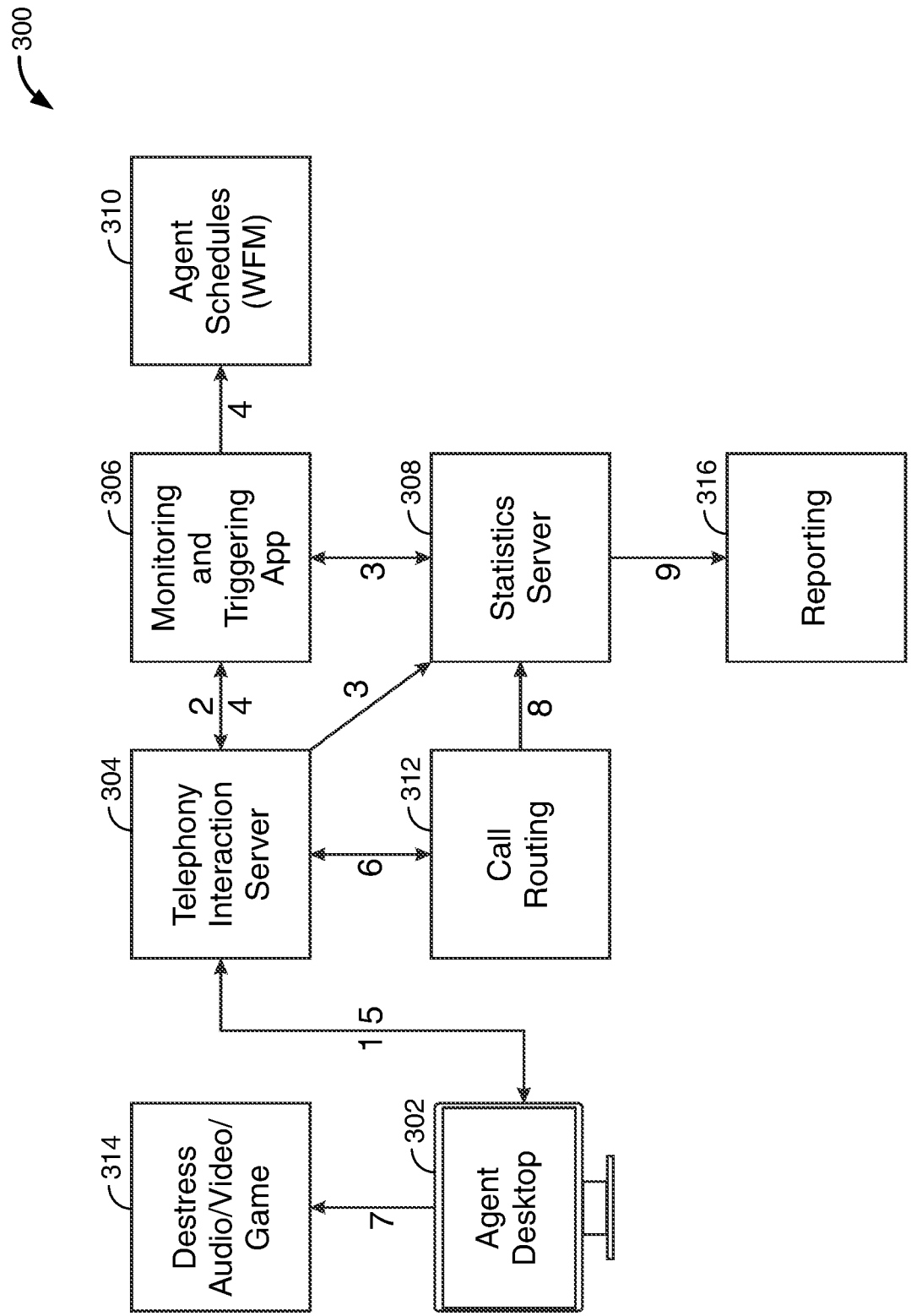
FIG. 3 shows an illustrative block diagram in accordance with principles of the disclosure.

FIG. 3 shows illustrative diagram 300. Illustrative diagram 300 may show a contact center agent destress mode utilizing a monitoring and triggering application (MTA).

The contact center agent, herein called agent, may login by using agent desktop 302. The agent may log into telephony interaction server 304 via agent desktop 302. Telephony interaction server 304 may provide work items to desktop 302 such as incoming voice calls from customers. After the login event, notification may be provided to MTA 306.

MTA 306 may subscribe to statistics server 308 for statistics regarding the agent and the latter's performance at the contact center. MTA 306 may train and run the MTA AI/ML algorithm to determine the agent's level of stress. If MTA AI/ML algorithm logic determines a destress work item, also referred to as a destress break, is warranted for the agent, MTA 306 may seek approval from the agent's manager. When receiving approval, MTA 306 may contact agent scheduling workforce management ("WFM") tool 310 to inform the latter that a destress work item is being provided to the agent. This step may avoid penalizing the contact agent for time spent on the destress work item, since the agent may not receive work items such as incoming voice calls during the destress work item.

MTA 306 may send a destress work item specific for the agent to telephony interaction server 304. Telephony interaction server 304 may communicate with the agent via the agent desktop 302 to inform the agent of the approval of the destress work item. The agent may have an opportunity to approve or deny the destress work item.

When receiving approval from the agent, call routing 312 blocks the agent from receiving other interactions and, once the existing call ends, routes the destress work item. Agent desktop 302 may then receive and play destress audio, destress video, or destress game 314. Agent desktop 302 may include a business user interface component. The destress work item may contain a URL that provides agent desktop 302 with access to the destress work item. The destress work item may be provided to the agent's soft phone.

Call routing 312 may contact statistics server 308 to update the latter about the destress work item. Statistics server 308 may contact reporting 316 to inform the latter about the agent's destress work item.

Once completing the destress work item, MTA 306 may instruct telephony interaction server 304 to provide agent desktop 302 with work items including voice calls.

Aspects of MTA 306 may include integrated reporting, blended routing, and full automation such that the agent may not need to change states throughout the day. MTA 306 may ensure that the outbound predictive pace is preserved.

Figure 4:
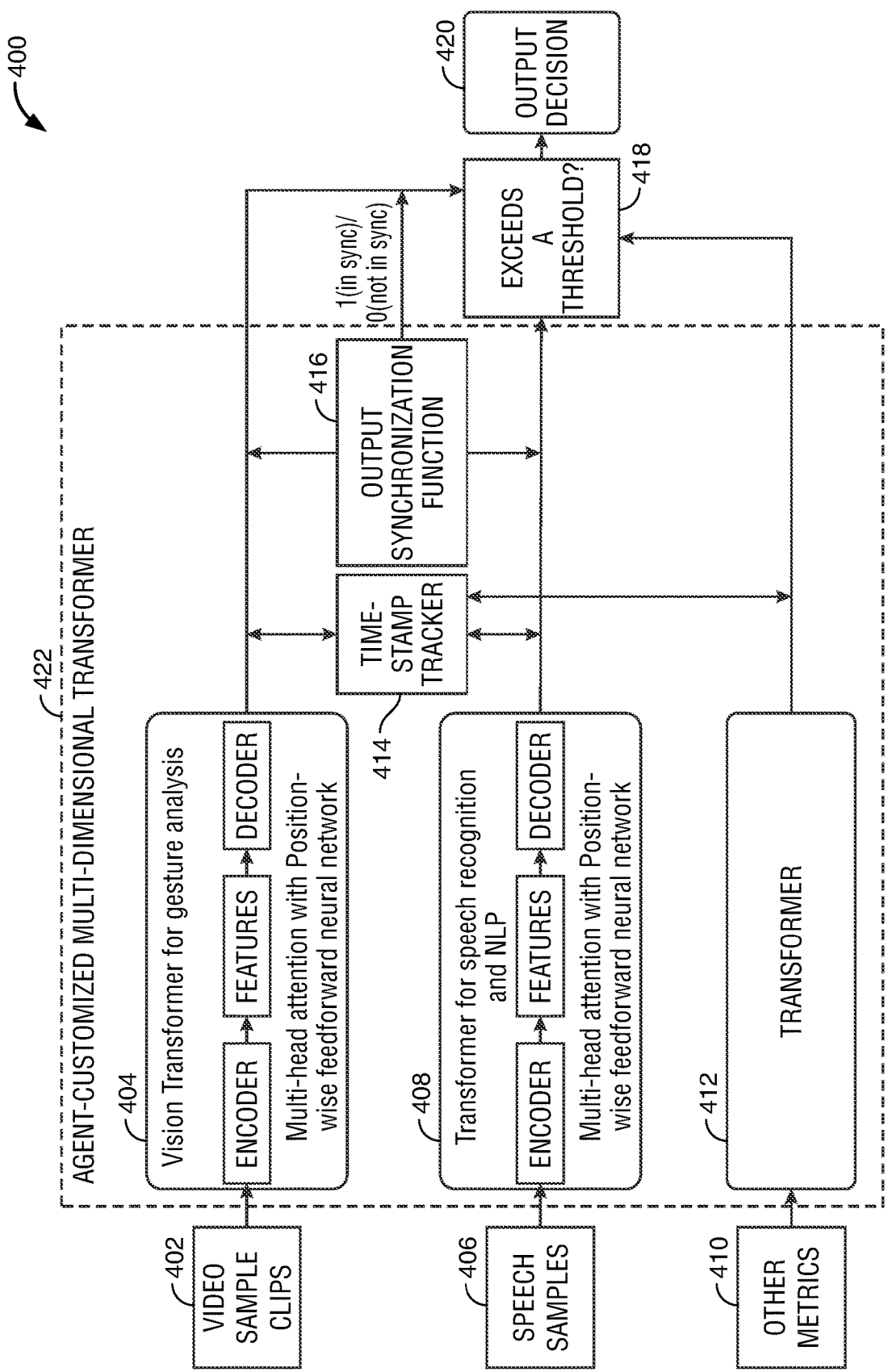
FIG. 4 shows an illustrative block diagram in accordance with principles of the disclosure.

FIG. 4 shows illustrative diagram 400. Illustrative diagram 400 may show agent-customized multi-dimensional transformer 422 for an agent. A processor may run agent-customized multi-dimensional transformer 422.

Video sample clips 402 may be taken from an agent's voice call. The MTA may receive video sample clips 402. The GPU running the MTA may run vision transformer for gesture analysis 404. Vision transformer for gesture analysis 404 may receive video sample clips 402 and process them as part of the MTA AI/ML algorithm to determine when the agent may need a destress break.

Vision transformer for gesture analysis 404 may include an encoder, a features identifier, and a decoder. Vision transformer for gesture analysis 404 may form a multi-head attention ("MHA") with position-wise feedforward neural network ("FNN"). MHA may be a variant of machine learning-based attention. The latter may be a mechanism that intuitively mimics cognitive attention. The FNN may be a type of artificial neural network. The flow of information between layers in the FNN may be by uni-directional flow. This means that the information flows only in one direction, in a forward direction, from the input nodes, through the hidden nodes and to the output nodes, without any cycles or loops.

Use of vision transformer for gesture analysis 404 may lead to determining when video features fall below a predetermined threshold indicating the agent is experiencing stress.

Speech samples 406 may be taken from an agent's voice call. The MTA may receive speech samples 406. The GPU running the MTA may run transformer for speech recognition and nature language processing ("NLP") 408. Transformer for speech recognition and NLP 408 may receive speech samples 406 and process them as part of an MTA AI/ML algorithm to determine when the agent may need a destress break.

Transformer for speech recognition and NLP 408 may include an encoder, a features identifier, and a decoder. Transformer for speech recognition and NLP 408 may form an MHA with position-wise FNN. Transformer for speech recognition and NLP 408 may be used to determine when speech features fall below a predetermined threshold indicating the agent is experiencing stress. Speech features may include sentiment score of a call feature, a tone score from a call transcript feature, and a tone score from a voice analysis feature.

The agent's performance over a series of work items such as answering incoming voice calls may provide other metrics 410. These metrics may include the number of calls answered, time since last break, duration of calls, escalation of calls, direct feedback from customer, AHT, number of utterances by agent for solving a use case, among other metrics. A GPU running the MTA may process these metrics by running transformer 412.

Timestamp tracker 414 may provide a time stamp for features of vision transformer for gesture analysis 404, for features of transformer speech recognition and NLP 408, and for metrics of transformer 412. The GPU running the MTA may run timestamp tracker 414. The timestamp tracker checks the variance between the current and the previous outputs for training purposes.

Output synchronization function 416 may provide a tool for validating outputs from vision transformer multi-dimensional transformer 404 and transformer for speech recognition and NLP 408. The GPU running the MTA may run output synchronization function 416. The outputs of each may indicate alignment of measurements of an emotional state of the agent. When one of the features indicates the agent may have an emotional state of stress, output synchronization function 416 may validate that other features support the assessment of stress. When the features are aligned, the output may be considered as synchronized.

The GPU running the MTA may determine if any of the transformed measurements exceeds a threshold 418 set for that measurement. The threshold may be a predetermined threshold. The threshold may be a threshold determined in real-time. The threshold may be unique for a specific feature or metric.

When features fall below a threshold, output decision 420 may be to offer a destress break. When features fall below a threshold and are synchronized, output decision 420 may be to offer a destress break. A supervisor of the agent may receive output decision 420 and decide whether to offer a destress break to the agent.

Figure 5:
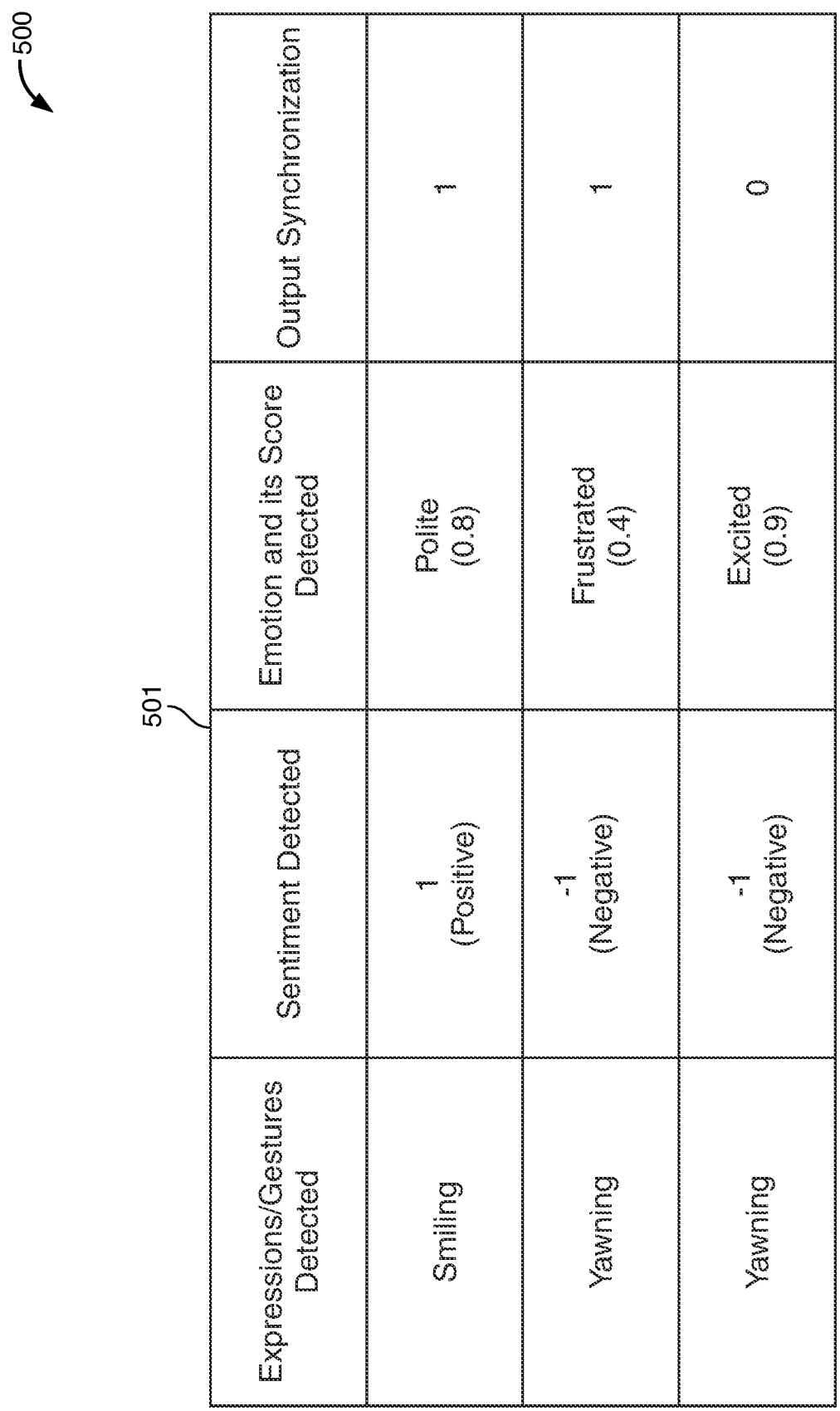
FIG. 5 shows an illustrative block diagram in accordance with principles of the disclosure.

FIG. 5 may show an illustrative flow diagram. FIG. 5 shows an illustrative diagram 500 of an output synchronization function. Illustrative diagram 500 may show a flow diagram for the output synchronization function.

Table 501 may illustrate a table describing the determination of synchronization. Expressions and gestures may be detected, for example, from video sample clips. The expressions and gestures may be analyzed to determine a sentiment. For example, an expression of smiling may result in a sentiment detection score of 1 indicating a positive sentiment. An expression of yawning may result in a sentiment detection score of −1 indicating a negative sentiment.

Emotion and its score may be detected, for example, from video sample clips and/or speech samples. For example, measurements of politeness in the agent's speech may have a score of 0.8. Frustration in the agent's speech may have a score of 0.4. Excitement in the agent's speech may have a score of 0.9.

A synchronization (sync) output may be 1 when the sentiment score is 1 and the emotion and its score is greater than 0.5, or when the sentiment score is −1 and the emotion and its score is 0.5 or less.

The sync output may be 0 when the sentiment score is 1 and the emotion and its score is 0.5 or less, or when the sentiment score is −1 and the emotion and its score is greater than 0.

Figure 6:
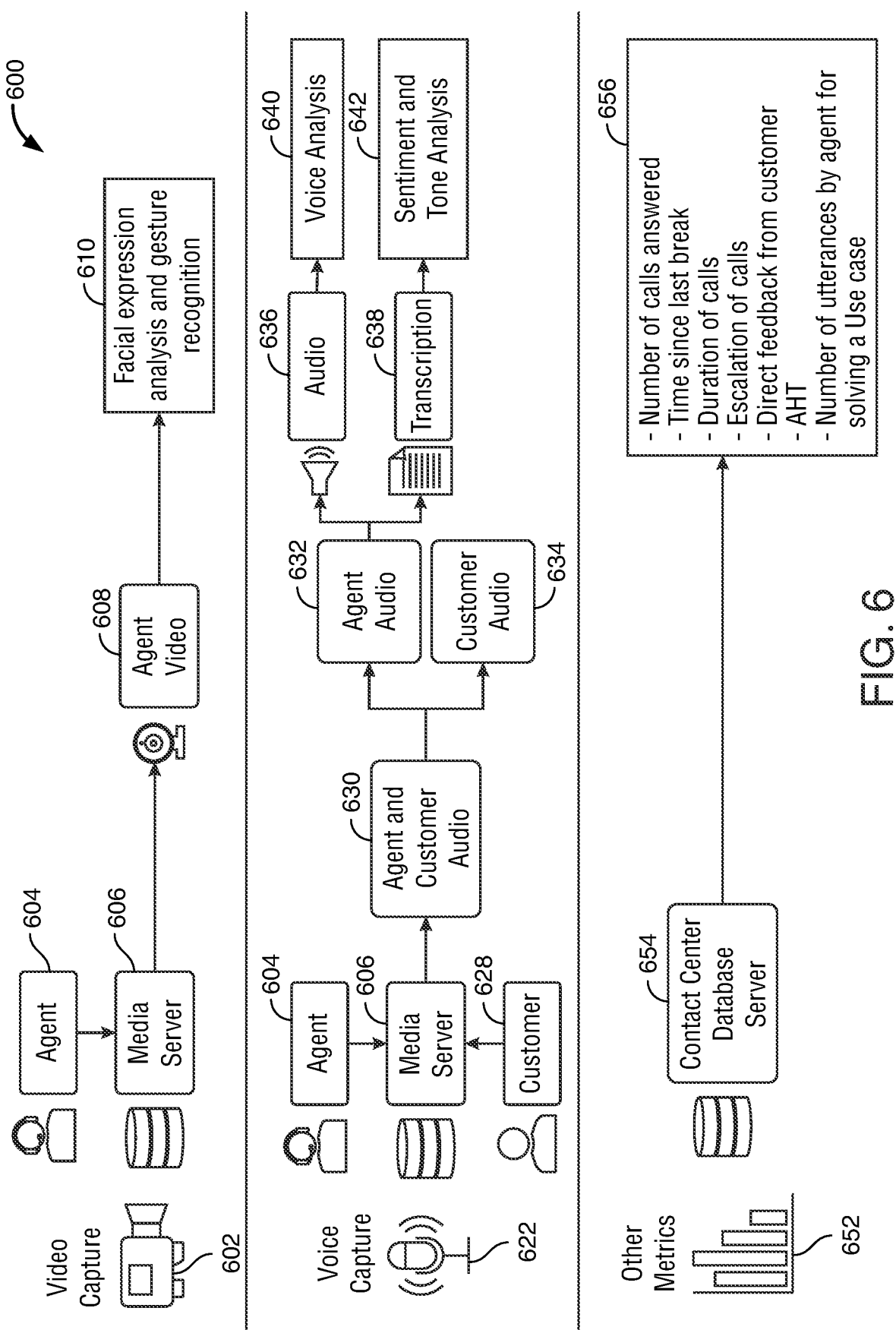
FIG. 6 shows an illustrative block diagram in accordance with principles of the disclosure.

FIG. 6 shows illustrative diagram 600. Illustrative diagram 600 may show a flow diagram for input extraction of video sample clips.

Video capture 602 shows the steps for analyzing an agent's video. A video of agent 604 may be captured during a call and stored on media server 606. A GPU may run an MTA AI/ML algorithm to extract relevant data from stored agent video 608. Output of the MTA AI/ML algorithm may include facial expression analysis and gesture recognition.

Voice capture 622 shows the steps for analyzing an agent's conversation. An audio of agent 604 and customer 628 may be captured during a call and stored on media server 606. For example, audio may be acquired as a WAV or MP3 file. The GPU may run an MTA AI/ML algorithm to extract relevant data from stored agent and customer audio 630 such as by pre-processing the audio data to clean it and remove noise.

The GPU may run an MTA AI/ML algorithm to segment the audio data by speaker diarization to determine when different speakers are speaking. Diarization may enable clustering agent audio 632 and customer audio 634, focusing on the former and ignoring the latter. The GPU may run an MTA AI/ML algorithm may segment agent audio 632 further between audio 636 and transcription 638. Transcription 638 may be accomplished by a speech recognition engine that converts the audio to text.

The output of the MTA AI/ML algorithm for audio 636 may include voice analysis 640. The output of the MTA AI/ML algorithm for transcription 638 may include sentiment and tone analysis 642.

Other metrics capture 652 shows the steps for analyzing other metrics relating to the agent the call. The other metrics may be captured and stored on contact center database (DB) server 654. A GPU may run an MTA AI/ML algorithm to extract relevant features based on call data since the agent's last reported break. Output of the MTA AI/ML algorithm may analyze the other metric data for number of calls answered, time since last break, duration of calls, escalation of calls, direct feedback from customer, AHT, and number of utterances by agent for solving a use case.

Figure 7:
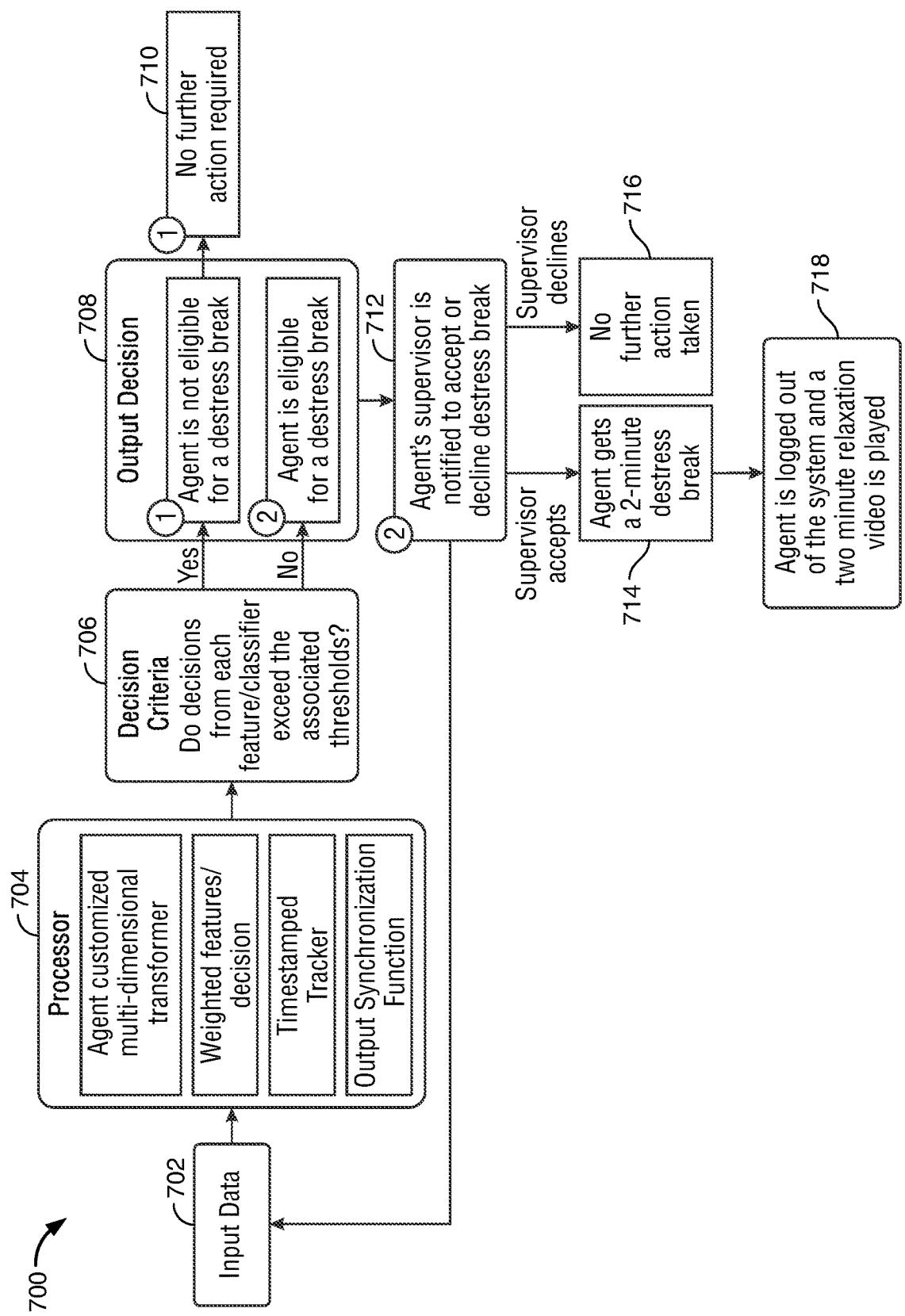
FIG. 7 shows an illustrative block diagram in accordance with principles of the disclosure.

FIG. 7 shows illustrative diagram 700. Illustrative diagram 700 may show an MTA flow diagram such as processing, output, and post-processing.

Input data 702, such as captured video, captured audio, and other metrics, may be inputted into a processor 704. Processor 704 may also include an agent-customized multi-dimensional transformer. A GPU may run the MTA AI/ML algorithm to run the transformers. Processor 704 may include weighted features which may be the output of transformers. Processor 704 may include weighted decisions which may give more weight to one feature than another. Some features may be more revealing of an agent's stress level than other features, and this may vary from agent to agent. Weighting decisions may allow for customizing the MTA AI/ML algorithm to from agent to agent.

Processor 704 may timestamp input data 702. Processor 704 may use an output synchronization function to synchronize input data 702. Synchronization of input data 702 may allow determination of a need for a destress break of an agent. Synchronization indicating a need for a destress break may exist when multiple features of input data 702 with a similar timestamp show that the agent is stressed.

Decision criteria 706 may use the GPU to run the MTA AI/ML algorithm to determine if decisions from each feature and/or classifier fall below their associate threshold. When the feature and/or classifier falls below its associated threshold, then output decision 708 may be that the agent is not eligible for a destress break. When a destress break is not indicated, no further action may be required 710.

When the feature and/or classifier does not fall below its associated threshold, then output decision 708 may be that the agent is eligible for a destress break. When a destress is indicated, the agent's supervisor may be notified to accept or decline the destress break 712. When the supervisor declines, no further action may be taken 716.

When the supervisor accepts, the agent may proceed to get a two-minute destress break 714. The agent may be logged out of the system and have a two-minute relaxation video played 718. When completing the relaxation video, the agent may be logged back into the system.

There may be a feedback loop going from 712 to 702. The feedback loop may help the model distinguish between what is considered an appropriate destress break and what is not in each agent-supervisor relationship.

Figure 8:
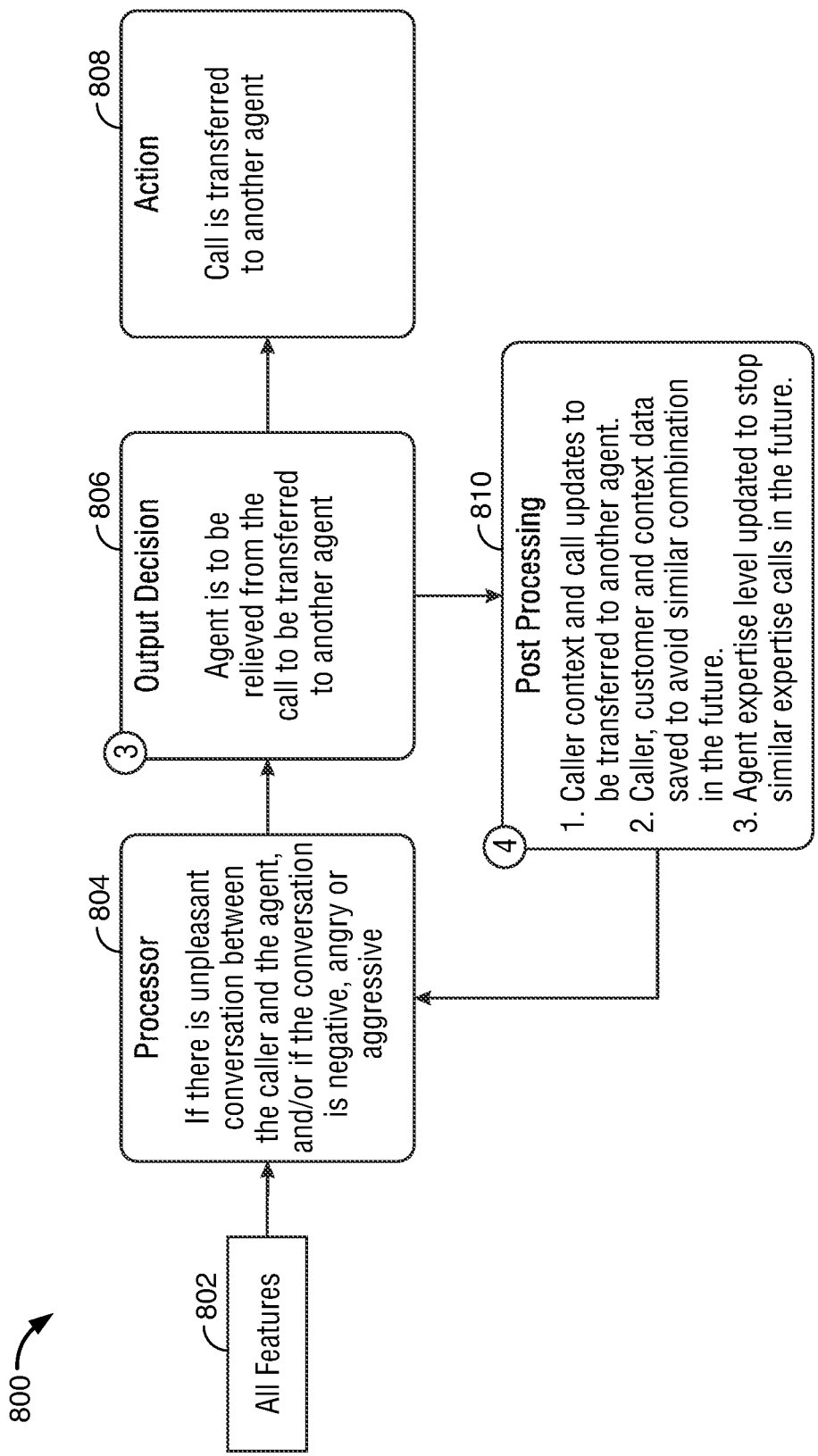
FIG. 8 shows an illustrative block diagram in accordance with principles of the disclosure.

FIG. 8 may show an illustrative flow diagram. FIG. 8 shows an illustrative diagram 800. Illustrative diagram 800 may show a flow diagram for the MTA flow diagram for post-processing.

All features 802 may include a video clip sample, an audio sample, and other metrics. Processor 804 may detect an unpleasant conversation between the caller and the agent. Processor 804 may detect a negative, angry, or aggressive.

Output decision 806 may determine in an instance where processor 804 detects any of the aforementioned to relieve the agent from the call. Action 808 may entail transferring the call to another agent.

Post-processing 810 may include transferring the caller context and call updates to another agent. Post-processing 810 may include saving the caller, customer, and context data to avoid a similar combination in future. Post-processing 810 may include updating agent expertise level to stop similar expertise calls in future.

Figure 9:
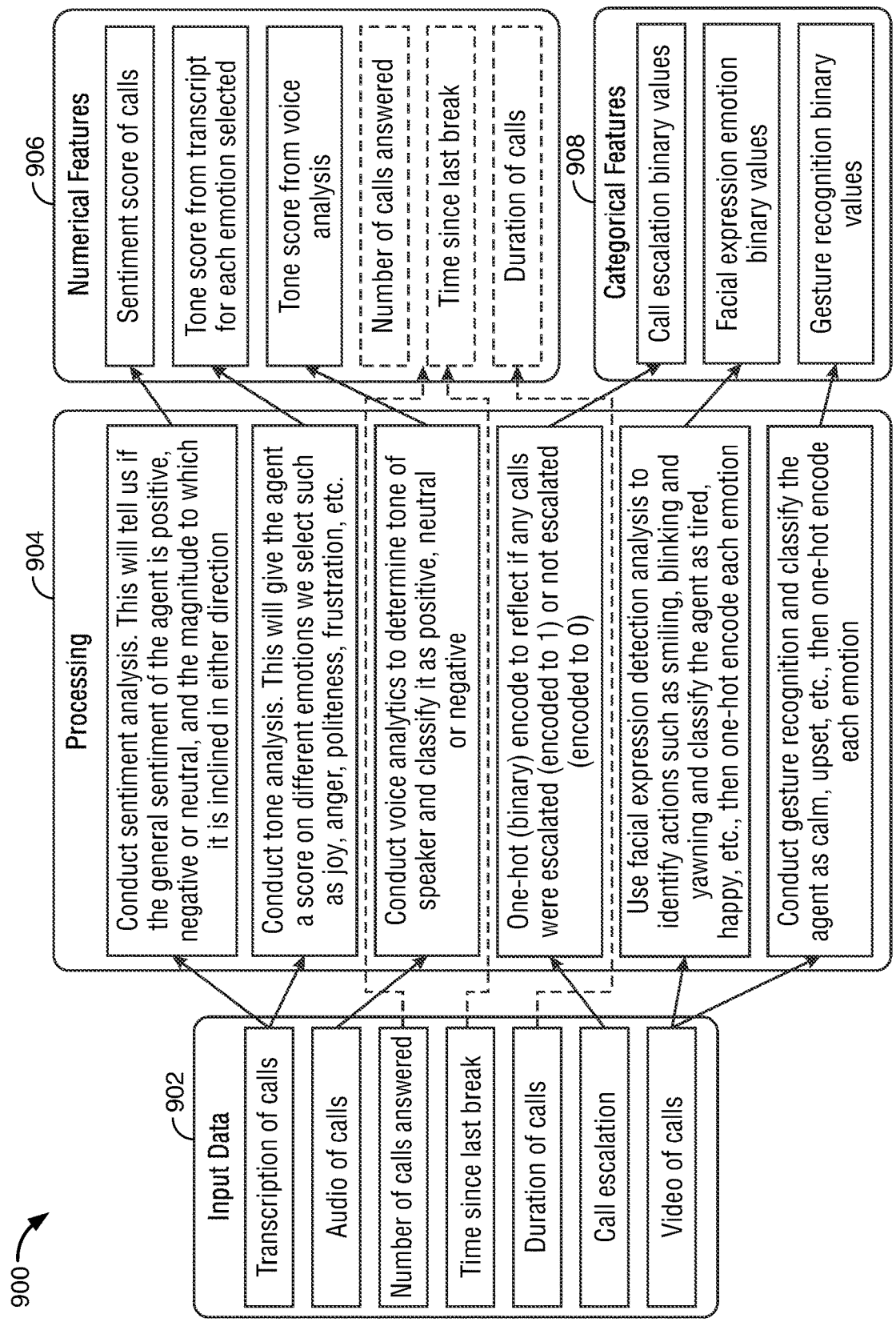
FIG. 9 shows an illustrative block diagram in accordance with principles of the disclosure.

FIG. 9 shows illustrative diagram 900. Illustrative diagram 900 may show a flow diagram for the MTA flow diagram for post-processing. Input data 902 may include a transcription of calls, an audio of calls, a number of calls answered, time since a last break, duration of calls, call escalation, and video of calls.

Processing 904 may illustrate how a processor handles input data 902. Numerical features 906 and categorical features 908 may illustrate how the input data 902 and results of processing 904 are used to obtain features.

For example, the transcript of calls may be used to conduct sentiment analysis. Sentiment analysis may reveal if the general sentiment of the agent is positive, negative, or neutral, and the magnitude to which it is inclined in either direction. These may feed into generating a sentiment score of calls.

Transcription of call may also be used to conduct tone analysis. Tone analysis may give the agent a score on different emotions we select such as joy, anger, politeness, frustration, etc. These may feed into generating a tone score from the transcript for each emotion selected.

Speech samples of calls may be used to conduct voice analytics to determine a tone of speaker and classify it as positive, neutral, or negative. These may contribute to a tone score from voice analysis.

The inputs of number of calls answered, time since last break, and duration of calls may be carried over directly as features bearing the same information.

The input of call escalation may be processed as a one-hot (binary) encode to reflect if any calls were escalated (encoded to 1) or not escalated (encoded to 0). These may lead to the feature of a call escalation binary value.

The input of video of the calls may be processed to use facial expression detection analysis to identify actions such as smiling, blinking, and yawning, and classify the agent as tired, happy, etc., A one-hot code may encode each emotion. This may lead to facial expression emotion binary values.

The input of video of the calls may be processed to conduct gesture recognition and classify the agent as calm, upset, etc. A one-hot code may encode each emotion. This may lead to gesture recognition of binary values.

Figure 10A:
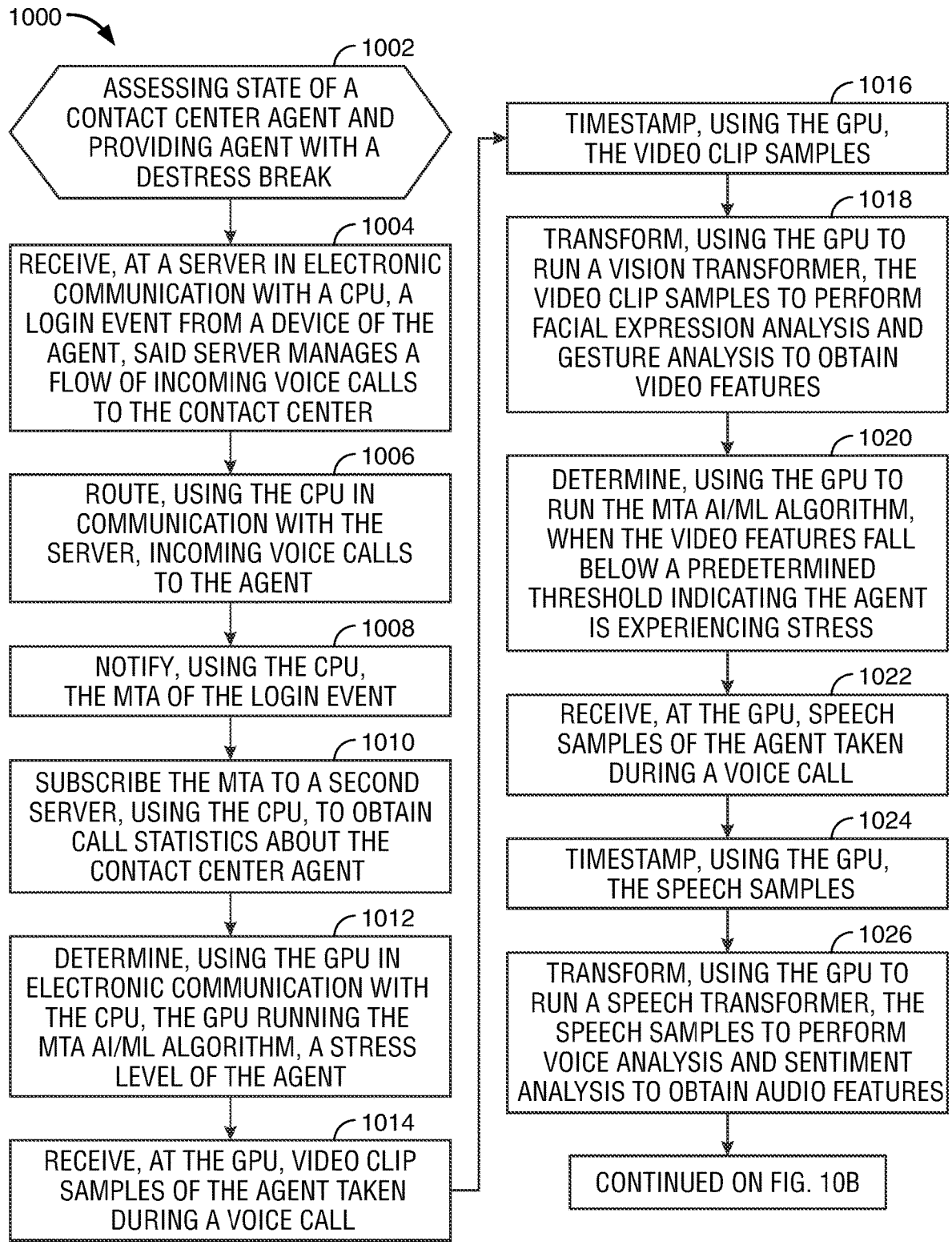
FIG. 10A shows an illustrative flowchart in accordance with principles of the disclosure.

FIG. 10A shows illustrative flowchart 1000, beginning at step 1002, that may provide for assessment of an emotional state of a contact center agent and may provide the agent with a destress break when necessary.

At step 1004, the first enterprise server that is in electronic communication with a CPU associated with the enterprise may receive a login event from a device of the agent. The server may manage a flow of incoming voice calls to the contact center.

At step 1006, the CPU in communication with the first enterprise server may route incoming voice calls to the agent.

At step 1008, the CPU may notify the MTA of the login event.

At step 1010, the CPU may subscribe to a second enterprise server. The second enterprise server may provide call statistics about the contact center agent to the MTA.

At step 1012, the GPU in electronic communication with the CPU may use the MTA AI/ML to determine a stress level of the agent.

At step 1014, the GPU may receive video clip samples of the agent taken during a voice call.

At step 1016, the GPU may timestamp the video clip samples.

At step 1018, the GPU may run a vision transformer to transform the video clip samples to perform facial expression analysis and gesture analysis to obtain video features. Running the vision transformer may obtain video features such as a facial expression emotion value feature and a gesture recognition value feature.

At step 1020, the GPU may run the MTA AI/ML algorithm to determine when the video features fall below a predetermined threshold that may indicate the agent is experiencing stress. Each video feature may have its own predetermined threshold.

At step 1022, the GPU may receive speech samples of the agent during a voice call. At step 1024, the GPU may timestamp the speech samples.

At step 1026, the GPU may run a speech transformer to transform the speech samples to perform voice analysis and sentiment analysis to obtain audio features. Running the speech transformer may obtain audio features such as a tone score from a call transcript feature and a tone score from a voice analysis feature.

Figure 10B:
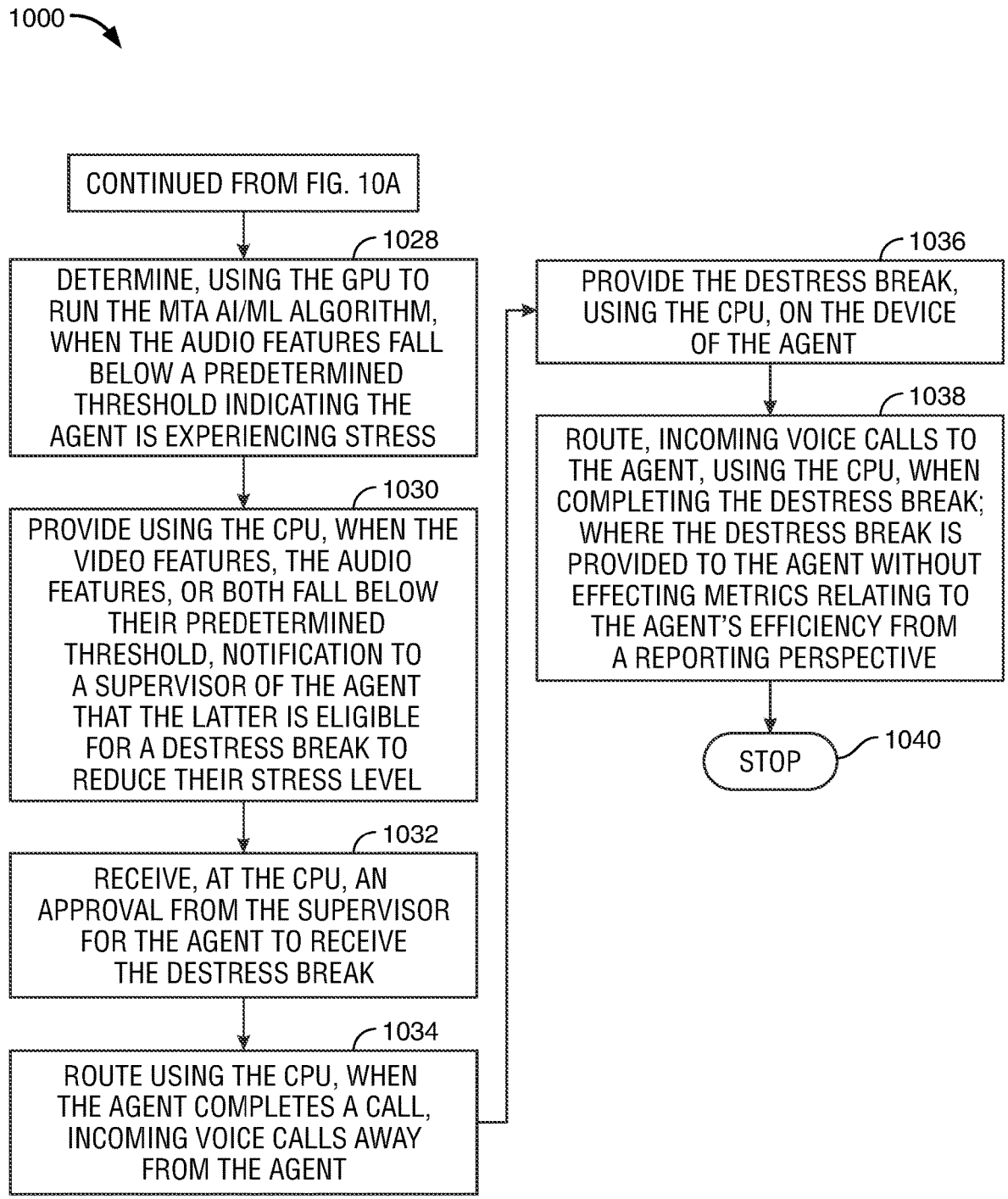
FIG. 10B shows an illustrative flowchart in accordance with principles of the disclosure.

The method continues to FIG. 10B. The method, in FIG. 10B, may continue with step 1028.

At step 1028, the GPU may run the MTA AI/ML algorithm to determine when the audio features fall below a predetermined threshold that may indicate the agent is experiencing stress. Each audio feature may have its own predetermined threshold.

At step 1030, the CPU that is in electronic communication with the GPU may provide, when the video features, the audio features, or both fall below their predetermined threshold, notification to a supervisor of the agent that the latter is eligible for a destress break to reduce the agent's stress level.

At step 1032, the CPU may receive an approval from the supervisor for the agent to receive the destress break.

At step 1034, the CPU may route incoming voice calls away from the agent once the agent completes their current call.

At step 1036, the CPU may provide the destress break on the device of agent.

At step 1038, the CPU may route incoming voice calls to the agent when the agent completes the destress break. The CPU may provide the destress break to the agent without effecting metrics relating to the agent's efficiency from a reporting perspective.

At step 1040, the method may stop.

Thus, provided may be systems and methods relating to the MTA AI/ML for destressing a contact center agent. Persons skilled in the art will appreciate that the present invention can be practiced by other than the described embodiments, which are presented for purposes of illustration rather than of limitation. The present invention is limited only by the claims that follow.

What is claimed is:

1. A system for destressing an agent in a contact center of an enterprise, the system comprising:
    a desktop computer station of a contact center agent;

a first enterprise server, said first enterprise server comprising a telephony interaction server for managing a flow of incoming voice calls to the contact center;

a second enterprise server, said second enterprise server comprising a statistics server for providing call statistics about contact center agents;

a graphics processing unit ("GPU");

a central processing unit ("CPU"), said CPU in electronic communication with the desktop computer station of the contact center agent, the first enterprise server, the second enterprise server, and the GPU; and a monitoring and triggering application ("MTA") that is run on the GPU or the CPU and comprises an artificial intelligence machine learning ("MTA AI/ML") algorithm;

wherein:

the first enterprise server is in electronic communication with the CPU, and is configured to:
receive a login event from the desktop computer station of a contact center agent; and
route one or more incoming voice calls to the contact center agent;

the CPU is configured to:
notify the MTA of the login event; and
subscribe the MTA to a second enterprise server, said second enterprise server providing call statistics about the contact center agent to the MTA;

the GPU is in electronic communication with the CPU, said GPU configured to run the MTA AI/ML algorithm, said MTA AI/ML algorithm configured to determine a stress level of the contact center agent, and said GPU running the MTA AI/ML algorithm is configured to:
receive one or more video clip samples of the contact center agent, the one or more video clip samples taken during a voice call;
timestamp the one or more video clip samples;
transform, using a vision transformer, the one or more video clip samples to perform facial expression analysis and gesture analysis to obtain one or more video features comprising a facial expression emotion value feature and a gesture recognition value feature;
determine when one or more video features fall below a predetermined threshold indicating the contact center agent is experiencing stress, where each of the one or more video features has its own predetermined threshold; and
receive one or more speech samples of the contact center agent, the speech samples taken during a voice call;
timestamp the one or more speech samples;
transform, using a speech transformer, the one or more speech samples to perform voice analysis and sentiment analysis to obtain one or more audio features comprising a sentiment score of a call feature, a tone score from a call transcript feature, and a tone score from a voice analysis feature;
determine when one or more audio features fall below a predetermined threshold indicating the contact center agent is experiencing stress, where each of the one or more audio features has its own predetermined threshold;

when the one or more video features, the one or more audio features, or both the one or more video features and the one or more audio features fall below predetermined thresholds, the CPU, in electronic communication with the GPU, is configured to:
provide notification to a supervisor of the contact center agent that the contact center agent is eligible for a destress break, said destress break for reducing the stress level of the contact center agent; and
receive an approval from the supervisor for the contact center agent to receive the destress break;

when the contact center agent completes a most recent incoming voice call, the CPU, in electronic communication with the first enterprise server, is configured to:
route incoming voice calls away from the contact center agent;
provide, on the desktop computer station of the contact center agent, the destress break; and
when completing the destress break, route incoming voice calls to the contact center agent;
wherein the destress break is provided to the contact center agent without effecting metrics relating to an efficiency of the contact center agent from a reporting perspective.

2. The system of claim 1 wherein the destress break has a duration, said duration comprising between one minute and five minutes.

3. The system of claim 1 when a video feature falls below a predetermined video threshold leading to the destress break, further comprising the GPU that is configured to run the MTA AI/ML algorithm to:
analyze the contact center agent to determine when the video feature no longer falls below its predetermined video threshold; and
when the video feature no longer falls below its predetermined video threshold and a predetermined threshold of time has elapsed, complete the destress break.

4. The system of claim 1 wherein a determination of the stress level of the contact center agent is in real-time.

5. The system of claim 1 wherein the destress break comprises providing the contact center agent with a video recording, an audio recording, or a game.

6. The system of claim 1 wherein the contact center agent is kept logged on to the first enterprise server while the contact center agent receives the destress break.

7. The system of claim 1 wherein the contact center agent is logged off of the first enterprise server while the contact center agent receives the destress break.

8. A method for destressing an agent in a contact center of an enterprise, the method comprising:
receiving, at a first enterprise server in electronic communication with a central processing unit ("CPU") associated with the enterprise, a login event from a device of a contact center agent, said first enterprise server for managing a flow of incoming voice calls to the contact center;
routing, using the CPU that is in electronic communication with the first enterprise server, one or more incoming voice calls to the contact center agent;
notifying, using the CPU, a monitoring and triggering application ("MTA") of the login event;
subscribing the MTA to a second enterprise server, using the CPU that is in electronic communication with the second enterprise server, said second enterprise server providing call statistics about the contact center agent to the MTA;
determining, using a graphics processing unit ("GPU") running an MTA artificial intelligence machine learning ("MTA AI/ML") algorithm, a stress level of the contact center agent, said GPU is in electronic communication with the CPU, and said MTA AI/ML algorithm comprises:

receiving, at the GPU, one or more video clip samples of the contact center agent, the video clip samples taken during a voice call;

timestamping, using the GPU, the one or more video clip samples;

transforming, using the GPU to run a vision transformer, the one or more video clip samples to perform facial expression analysis and gesture analysis to obtain one or more video features comprising a facial expression emotion value feature and a gesture recognition value feature;

determining, using the GPU to run the MTA AI/ML algorithm, when one or more video features fall below a predetermined threshold indicating the contact center agent is experiencing stress, where each of the one or more video features has its own predetermined threshold;

receiving, at the GPU, one or more speech samples of the contact center agent, the speech samples taken during a voice call;

timestamping, using the GPU, the one or more speech samples;

transforming, using the GPU to run a speech transformer, the one or more speech samples to perform voice analysis and sentiment analysis to obtain one or more audio features comprising a sentiment score of a call feature, a tone score from a call transcript feature, and a tone score from a voice analysis feature;

determining, using the GPU to run the MTA AI/ML algorithm, when one or more audio features fall below a predetermined threshold indicating the contact center agent is experiencing stress, where each of the one or more audio features has its own predetermined threshold;

when the one or more video features, the one or more audio features, or both the one or more video features and the one or more audio features fall below a predetermined threshold, providing, using the CPU that is in electronic communication with the GPU, notification to a supervisor of the contact center agent that the contact center agent is eligible for a destress break, said destress break for reducing the stress level of the contact center agent;

receiving, at the CPU, an approval from the supervisor for the contact center agent to receive the destress break;

when the contact center agent completes a most recent incoming voice call, routing, using the CPU that is in electronic communication with the first enterprise server, incoming voice calls away from the contact center agent;

providing, using the CPU that is in electronic communication with the first enterprise server, on the device of the contact center agent, the destress break; and when completing the destress break, routing, using the CPU that is in electronic communication with the first enterprise server, incoming voice calls to the contact center agent;

wherein the destress break is provided to the contact center agent without effecting metrics relating to an efficiency of the contact center agent from a reporting perspective.

9. The method of claim 8 wherein the destress break has a duration, said duration comprising between one minute and five minutes.

10. The method of claim 8 when a video feature falls below a predetermined video threshold leading to the destress break, further comprising:

analyzing the contact center agent, during the destress break, using the GPU to run the MTA AI/ML algorithm, to determine when the video feature no longer falls below its predetermined video threshold; and when the video feature no longer falls below its predetermined video threshold and a predetermined threshold of time has elapsed, completing the destress break.

11. The method of claim 8 wherein a determination of the stress level of the contact center agent is in real-time.

12. The method of claim 8 wherein the device of the contact center agent is a desktop computer station.

13. The method of claim 8 wherein the destress break comprises providing the contact center agent with a video recording, an audio recording, or a game.

14. The method of claim 8 wherein the contact center agent is kept logged on to the first enterprise server while the contact center agent receives the destress break.

15. The method of claim 8, wherein the contact center agent is logged off of the first enterprise server while the contact center agent receives the destress break.

16. A method for destressing an agent in a contact center of an enterprise in real-time, the method comprising:

receiving, at a first enterprise server in electronic communication with a computer processer associated with the enterprise, a login event from a device of a contact center agent, said first enterprise server for managing a flow of incoming voice calls to the contact center;

routing, using a central processing unit ("CPU") that is in electronic communication with the first enterprise server, one or more incoming voice calls to the contact center agent;

notifying, using the CPU, a monitoring and triggering application ("MTA") of the login event;

subscribing the MTA to a second enterprise server, using the CPU that is in electronic communication with the second enterprise server, said second enterprise server providing call statistics about the contact center agent to the MTA;

determining, using a graphics processing unit ("GPU") running an MTA artificial intelligence machine learning ("MTA AI/ML") algorithm, a stress level of the contact center agent in real-time, said GPU in electronic communication with the CPU, and said MTA AI/ML algorithm comprises:

receiving, at the GPU, one or more video clip samples of the contact center agent, the video clip samples taken during a voice call;

timestamping, using the GPU, the one or more video clip samples;

transforming, using the GPU to run a vision transformer, the one or more video clip samples to perform facial expression analysis and gesture analysis to obtain one or more video features comprising a facial expression emotion value feature and a gesture recognition value feature;

determining, using the GPU to run the MTA AI/ML algorithm, when one or more video features fall below a predetermined threshold indicating the contact center agent is experiencing stress, where each of the one or more video features has its own predetermined threshold;

receiving, at the GPU, one or more speech samples of the contact center agent, the speech samples taken during a voice call;

timestamping, using the GPU, the one or more speech samples;

transforming, using the GPU to run a speech transformer, the one or more speech samples to perform voice analysis and sentiment analysis to obtain one or more audio features comprising a sentiment score of a call feature, a tone score from a call transcript feature, and a tone score from a voice analysis feature;

determining, using the GPU to run the MTA AI/ML algorithm, when one or more audio features fall below a predetermined threshold indicating the contact center agent is experiencing stress, where each of the one or more audio features has its own predetermined threshold;

when the one or more video features, the one or more audio features, or both the one or more video features and the one or more audio features fall below a predetermined threshold, providing, using the CPU that is in electronic communication with the GPU, notification to a supervisor of the contact center agent that the contact center agent is eligible for a destress break, said destress break for reducing the stress level of the contact center agent;

receiving, at the CPU, an approval from the supervisor for the contact center agent to receive the destress break;

when the tone score from the voice analysis feature for an ongoing first voice call fall below its predetermined threshold, determining, using the GPU to run the MTA AI/ML, when the tone score from the voice analysis feature falls below a lower predetermined threshold;

when falling below the lower predetermined threshold, transferring, using the CPU in electronic communication with the first enterprise server, the first voice call to another contact center agent while the first voice call is ongoing;

routing, using the CPU that is in electronic communication with the first enterprise server, incoming voice calls away from the contact center agent;

providing, using the CPU that is in electronic communication with the first enterprise server, on the device of the contact center agent, the destress break;

when completing the destress break, routing, using the CPU that is in electronic communication with the first enterprise server, incoming voice calls to the contact center agent; and updating an expertise level of the contact center agent at the first enterprise server, using the CPU, to stop routing incoming voice calls to the contact center agent that require a similar expertise to the expertise needed for the first voice call wherein:
the destress break is provided to the contact center agent without effecting metrics relating to an efficiency of the contact center agent from a reporting perspective;

the destress break comprises providing the contact center agent with a video recording, an audio recording, or a game; and the destress break has a duration, said duration comprising between one minute and ten minutes.

17. The method of claim 16 wherein the lower predetermined threshold indicates that a conversation during the first voice call between an incoming caller and the contact center agent comprises angry conversation, aggressive conversation, negative conversation, or combinations thereof.

18. The method of claim 16 when a video feature falls below a predetermined video threshold leading to the destress break, further comprising:
analyzing the contact center agent, during the destress break, using the GPU to run the MTA AI/ML algorithm, to determine when the video feature exceeds its predetermined video threshold; and
when the video feature exceeds its predetermined video threshold and at least one minute has elapsed, completing the destress break.

19. The method of claim 16 wherein the contact center agent is kept logged on to the first enterprise server while the contact center agent receives the destress break.

20. The method of claim 16 further comprising:
updating an expertise level of the contact center agent at the first enterprise server, using the CPU, to stop routing incoming voice calls to the contact center agent that require a similar expertise to the expertise needed for the first voice call.

* * * * *